United States Patent [19]
Blassingame et al.

[11] Patent Number: 6,109,639
[45] Date of Patent: Aug. 29, 2000

[54] ADVERTISING SHIELD

[76] Inventors: Rickey L. Blassingame, 291 PR 1801, Sunset, Tex. 76270; Gary A. Klein, 324 Diamond Oaks, Weatherford, Tex. 76087

[21] Appl. No.: 09/063,023

[22] Filed: Apr. 21, 1998

Related U.S. Application Data

[60] Provisional application No. 60/061,315, Oct. 7, 1997.
[51] Int. Cl.⁷ .................................................. B60P 3/10
[52] U.S. Cl. ............................. 280/414.1; 296/180.4; 40/591
[58] Field of Search ................. 280/414.1; 296/180.4; 362/485, 812; 40/559, 560, 590, 591, 594

[56] References Cited

U.S. PATENT DOCUMENTS

| | | | |
|---|---|---|---|
| 2,652,650 | 9/1953 | Helms et al. | 40/591 |
| 2,669,480 | 2/1954 | Messick et al. | 296/23 |
| 2,798,625 | 7/1957 | Mamo | 296/23 |
| 3,004,359 | 10/1961 | Pisciotta | 40/591 |
| 3,984,121 | 10/1976 | Dobosi | 296/23 |
| 3,989,267 | 11/1976 | Robinson | 296/23 |
| 4,157,200 | 6/1979 | Johnson | 296/1 |
| 5,076,603 | 12/1991 | Godbersen | 280/414.1 |
| 5,529,371 | 6/1996 | Egigian | 296/164 |
| 5,609,384 | 3/1997 | Loewen | 296/180.4 |
| 5,762,374 | 6/1998 | Grove et al. | 280/847 |

*Primary Examiner*—J. J. Swann
*Assistant Examiner*—James S. McClellan
*Attorney, Agent, or Firm*—Patent & Trademark Services; Joseph H. McGlynn

[57] ABSTRACT

A shield that can be attached to a trailer, such as a trailer that will tow a boat, and once in place the shield will protect the boat while in transit. In addition, the shield will have areas that can be used to place advertising medium thereon.

6 Claims, 2 Drawing Sheets

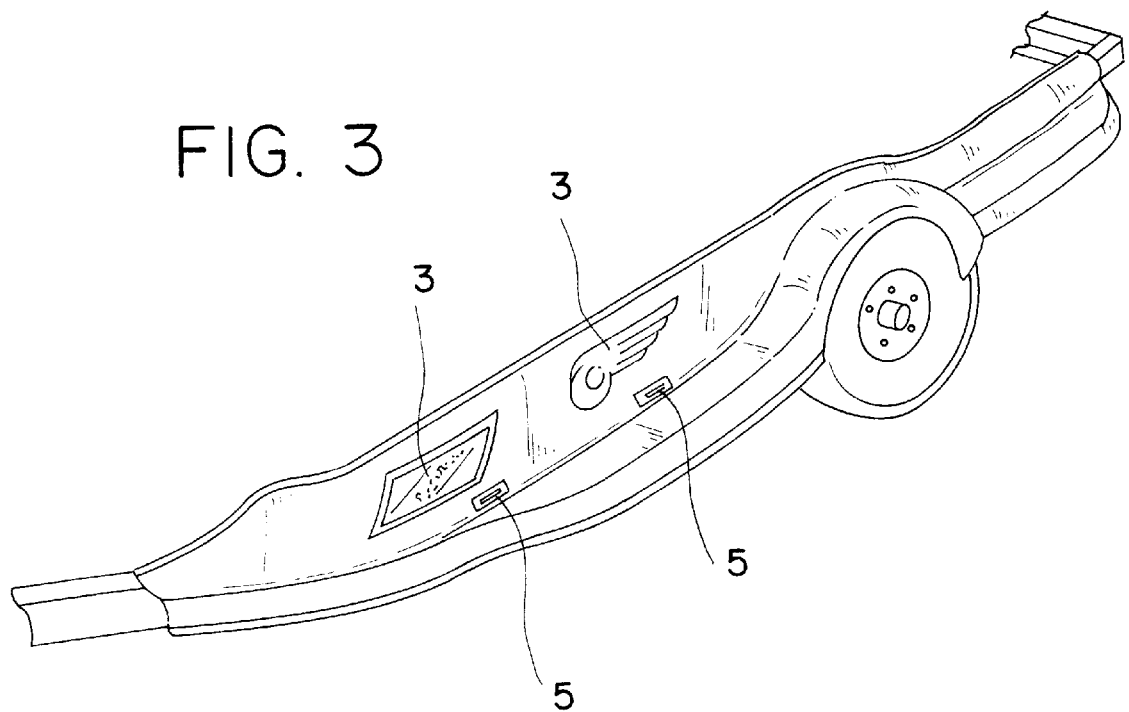
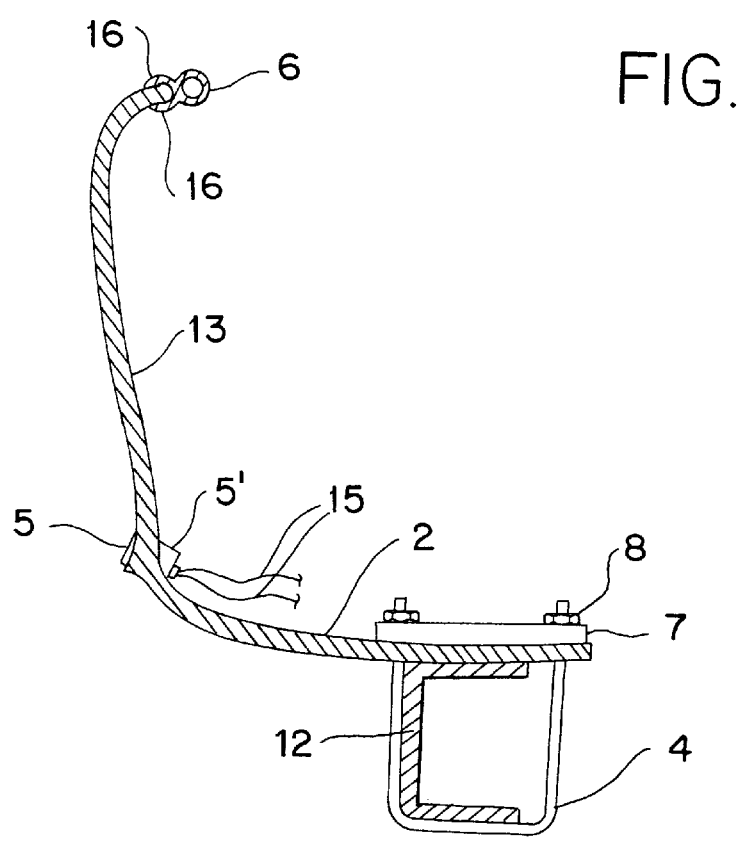

ADVERTISING SHIELD

This is a conversation of Provisional application 60/061,315, filed Oct. 7, 1997, to a Utility application.

BACKGROUND OF THE INVENTION

This invention relates, in general, to shields, and, in particular, to shields for trailers which have advertising indicia placed thereon.

DESCRIPTION OF THE PRIOR ART

In the prior art various types of shields have been proposed. For example, the patent to Messick et al, U.S. Pat. No. 2,669,480, discloses a boat trailer having a flexible frame mounted to the sides of the trailer to protect the boat during transit.

The patent to Mamo, U.S. Pat. No. 2,798,625, discloses a boat trailer having padded bottom supports to protect the boat during transit.

The patent to Dobosi, U.S. Pat. No. 3,984,121, discloses a boat trailer which has a plurality of bottom supports which conform to the shape of the bottom of the boat hull.

The patent to Robinson, U.S. Pat. No. 3,989,267, discloses a boat trailer which has rails mounted on opposite sides of the trailer to protect the boat during transit.

SUMMARY OF THE INVENTION

The present invention is directed to a shield that can be attached to a trailer, such as a trailer that will tow a boat, and once in place the shields will protect the boat while in transit. In addition, the shields will have areas that can be used to place advertising medium thereon.

It is an object of the present invention to provide a shield that can be attached to a trailer to protect an object on the trailer while in transit.

It is an object of the present invention to provide a shield that can be attached to a trailer and which will have areas to display advertising mediums.

It is an object of the present invention to provide an advertising shield that can be attached to a trailer and which will have illumination so the advertising will be visible at night.

These and other objects and advantages of the present invention will be fully apparent from the following description, when taken in connection with the annexed drawings.

BRIEF DESCRIPTION OF THE DRAWINGS

FIG. 3 is a perspective partial view of one of the shields of the present invention incorporated into a manufactured fender.

FIG. 4 is a cross-sectional view taken along the line AA in FIG. 2 of one of the shields of the present invention.

DESCRIPTION OF THE PREFERRED EMBODIMENT

Figure 1:
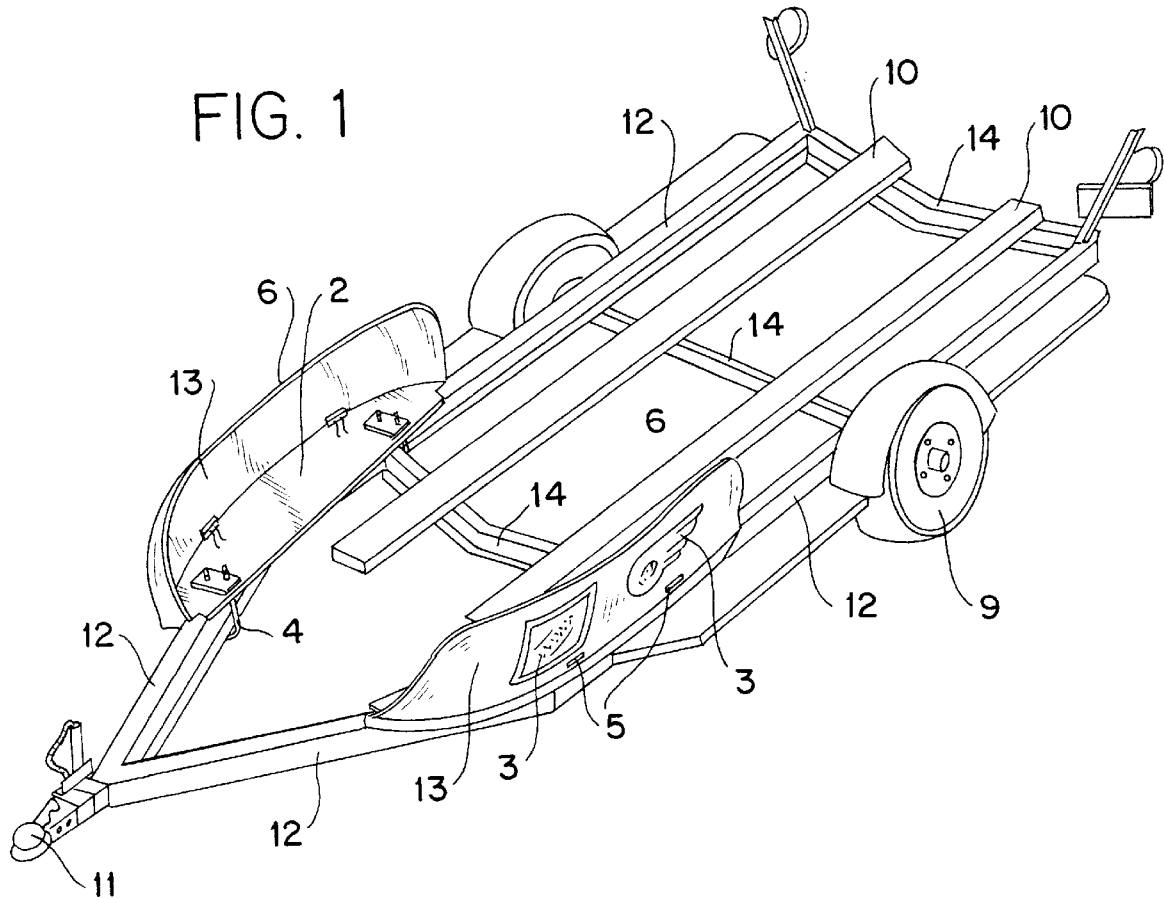
FIG. 1 is a perspective view of the shields of the present invention attached to a trailer.

Referring now to the drawings in greater detail, FIG. 1 shows a pair of shields 2, 13 of the present invention attached to a boat trailer. The boat trailer is a conventional trailer and is not part of the present invention. It should be noted that while the present invention is shown on a boat trailer, this is merely for illustrational purposes, and the shields could be used with other trailers such as, but not limited to, motorcycle or race car trailers.

The trailer shown in FIG. 1 comprises a pair of supports 12 extending along each side of the trailer, and attached to these supports are cross braces and axle 14, which support the tires 9. At the front of the trailer is a tow hitch 11, again of conventional design. Also, attached to the pair of cross braces and axle 14 are supports 10 for the boat to be supported on the trailer.

As shown in FIGS. 1 and 4, each of the shields of the present invention consist of a horizontal or base portion 2 and a vertical or side portion 13. The base portion 2 has apertures through which a pair of U-bolts 4 can be passed in order to secure the shields to the supports 12. The U-bolts have pressure plates 7 which will be positioned against the base portion 2 to spread the pressure from the nuts 8. The body of the U-bolts 4 will pass around the support 12 in order to secure the shield to the trailer.

The shields can be made from any durable material such as, but not limited to, fiberglass, aluminum, steel, or plastic. Due to the U-bolt mounting, the shields are not limited to being mounted on any particular trailer or on any particular part of the trailer. In this manner, the shields can be attached to any trailer and to any portion of the trailer where needed to protect the boat, motorcycle, or car, that is being hauled on the trailer, from mud, rocks, or other road debris that may be thrown from passing vehicles and thrown against the boat, motorcycle, or car.

Attached to the outside of the shields (the area facing away from the boat, motorcycle, or car being hauled) is at least one advertising logo 3. At The logos can be any type such as decals, or they can be painted onto the surface of the vertical portion 13.

Figure 2:
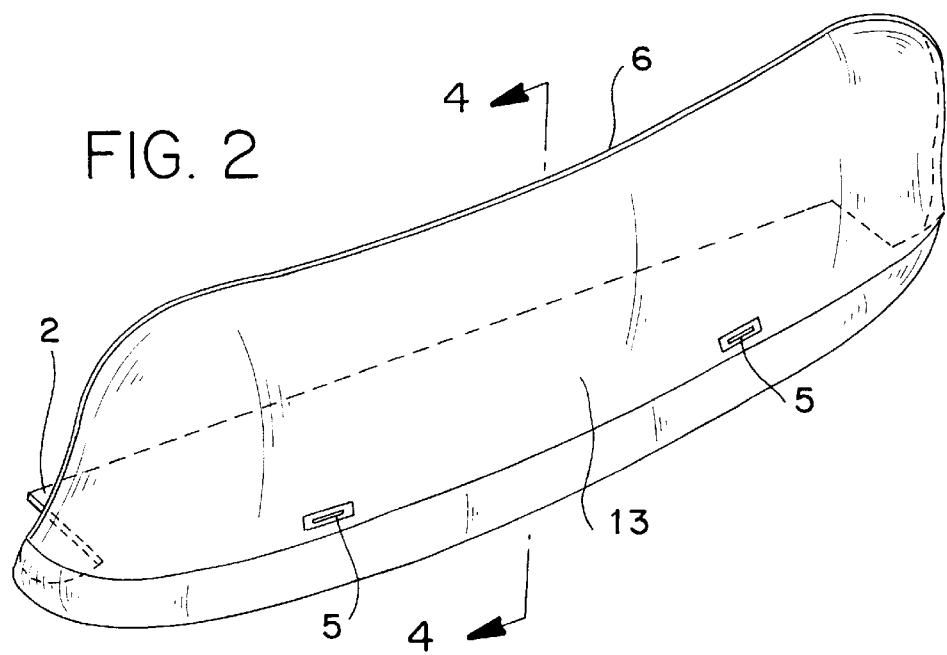
FIG. 2 is a perspective view of one of the shields of the present invention.

As shown in FIGS. 1, 2 and 4, a conventional light socket 5' is attached to the inside of the vertical portion 13 and has wires 15 which can be connected to the towing vehicle's electrical system in any conventional manner. The light sockets 5' project through the vertical portion 13 and have a light 5 which is positioned below the decals 3 so the decals will be visible at night.

Also, attached to the upper edge of the vertical portion 13 is a protective bumper 6. The bumper has two arms 16 attached thereto, so that the bumper can be slid over the top edge and frictionally secured thereto. The bumper 6 can be made of any relatively soft material, such as rubber or plastic, and will protect the finish of the boat, motorcycle, or car that is being hauled on the trailer from banging against the shields while in transit.

Although the Advertising Shield and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

We claim:

1. A shield in combination with a trailer, said trailer having longitudinal and horizontal support members, wheels attached to said support members and support members for holding an item to be transported on said trailer, said shield comprising:

a horizontal support member, a vertical support member integrally attached to said horizontal support member, said horizontal support member having fastening means for attaching said shield at one of a plurality of selected positions along said longitudinal support members, said vertical support member having an illumination means for illuminating an outside surface of said vertical support member, and a protective bumper secured to a top edge of said vertical support member.

2. The shield in combination with said trailer as claimed in claim 1, wherein said fastening means is a U-bolt that is attached to apertures in said horizontal support member.

3. The shield in combination with said trailer as claimed in claim 2, wherein said fastening means includes a pressure plate attached to a surface of said horizontal support member.

4. The shield in combination with said trailer as claimed in claim 1, wherein said protective bumper has a pair of arms with a space therebetween, said arms engaging on opposite sides of said vertical support member to secure said protective bumper to said vertical support, said protective bumper having a cushioning means, extending from said pair of arms, for protecting an item carried by said trailer.

5. The shield in combination with said trailer as claimed in claim 1, wherein said vertical support member has an inside surface and an outside surface, advertising indicia attached to said outside surface of said vertical support member.

6. The shield in combination with said trailer as claimed in claim 5, wherein said illumination means is positioned below said advertising indicia.

* * * * *